United States Patent
Liang et al.

(10) Patent No.: US 10,797,924 B2
(45) Date of Patent: Oct. 6, 2020

(54) METHOD AND APPARATUS FOR SENDING INFORMATION

(71) Applicant: ZTE CORPORATION, Shenzhen, Guangdong (CN)

(72) Inventors: Chunli Liang, Shenzhen (CN); Shuqiang Xia, Shenzhen (CN); Zhisong Zuo, Shenzhen (CN); Xianghui Han, Shenzhen (CN); Jing Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 13 days.

(21) Appl. No.: 16/210,220

(22) Filed: Dec. 5, 2018

(65) Prior Publication Data

US 2019/0173704 A1 Jun. 6, 2019

(30) Foreign Application Priority Data

Dec. 5, 2017 (CN) .......................... 2017 1 1271477

(51) Int. Cl.
*H04L 27/26* (2006.01)
*H04L 5/00* (2006.01)
*H04W 72/04* (2009.01)

(52) U.S. Cl.
CPC ........ *H04L 27/2613* (2013.01); *H04L 5/0051* (2013.01); *H04L 27/2607* (2013.01); *H04L 27/2614* (2013.01); *H04W 72/0413* (2013.01); *H04W 72/0453* (2013.01); *H04L 27/262* (2013.01)

(58) Field of Classification Search
None
See application file for complete search history.

(56) References Cited

U.S. PATENT DOCUMENTS

| | | | | |
|---|---|---|---|---|
| 2018/0115446 | A1* | 4/2018 | Adhikary | H04L 25/0226 |
| 2019/0013980 | A1* | 1/2019 | Gao | H04L 5/0055 |
| 2020/0028723 | A1* | 1/2020 | Gao | H04L 27/2636 |

* cited by examiner

*Primary Examiner* — Jason E Mattis
*Assistant Examiner* — Hong Shao
(74) *Attorney, Agent, or Firm* — Foley & Lardner LLP

(57) ABSTRACT

Provided is a method and apparatus for sending information. The method includes determining uplink information and/or a reference signal to be sent; and sending the uplink information and/or the reference signal to a communication node via a first sequence.

6 Claims, 3 Drawing Sheets

▨ Symbol used for sending the reference signal

☐ Symbol used for sending the HARQ-ACK information

METHOD AND APPARATUS FOR SENDING INFORMATION

CROSS-REFERENCE TO RELATED APPLICATIONS

This application claims priority to Chinese Patent Application No. CN 201711271477.3 filed on Dec. 5, 2017, the disclosure of which is incorporated herein by reference in its entirety.

TECHNICAL FIELD

The present disclosure relates to communications and, in particular, to a method and apparatus for sending information.

BACKGROUND

In the relate art, the 4th Generation mobile communication technology (4G) Long-Term Evolution (LTE)/Long-Term Evolution Advance (LTE-Advanced/LTE-A) and the 5th Generation mobile communication technology (5G) are facing increasing requirements. From the current development trend, both 4G and 5G systems are being studied for the characteristics of supporting enhanced mobile broadband, ultra-high reliability, ultra-low latency transmission, and massive connectivity.

In the new generation of radio (RN) technology, in the transmission of the physical uplink service channel, the comb transmission is supported. That is, in the process of transmission, data are only carried on odd or even subcarriers of the allocated bandwidth; and when the bandwidth allocated by the data channel is one resource block (abbreviated as RB, corresponding to 12 subcarriers in the frequency domain) or three resource blocks, when the comb transmission is used, the length of a sequence used for a reference signal may be 6 or 18. In addition, the short physical downlink control channel (PDCCH) has already agreed to use a sequence-base form for carrying up two bits of control information. Because the lasting time of the short PUCCH is short, new requirements are put forward to the corresponding sequence design. Therefore, there is need for a new sequence design with sequences having lengths of 6, 12, 18 and 24, at least the uplink control information transmission based on the short physical uplink control channel and a reference signal based on a comb physical uplink shared channel.

SUMMARY

The embodiments of the present disclosure provide a method and apparatus for sending information.

A method for sending information is provided by an embodiment of the present disclosure. The method includes: determining uplink information and/or a reference signal to be sent; and sending the uplink information and/or the reference signal to a communication node via a first sequence.

An apparatus for sending information is provided by an embodiment of the present disclosure.

The apparatus includes: a determining module, which is configured to determine uplink information and/or a reference signal to be sent; and a sending module, which is configured to send the uplink information and/or the reference signal to a communication node via a first sequence.

A storage medium is further provided by an embodiment of the present disclosure. The storage medium includes a stored program which, when executed, executes the above-mentioned method.

A processor is further provided by an embodiment of the present disclosure. The processor is used for executing a program, where, when executed, the program executes the above-mentioned method.

In the present disclosure, uplink information and/or a reference signal is sent to a communication node via a first sequence. The sequence is used as the reference signal or used for directly carrying the uplink information. In such way, the disclosure has the advantages of a small cubic metric and a high efficiency of the power amplifier, and provides a scheme of sending uplink information via a sequence in the comb transmission. When the sequence index used by a neighboring cell is different, the disclosure further reduces inter-cell interference and improves the overall performance of the system.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be described hereinafter in detail through embodiments with reference to the accompanying drawings. It is to be noted that if not in collision, the embodiments and features therein in the present disclosure may be combined with each other.

It is to be noted that the terms "first", "second" and the like in the description, claims and above accompanying drawings of the present disclosure are used to distinguish between similar objects and are not necessarily used to describe a particular order or sequence.

Embodiment 1

Figure 1:
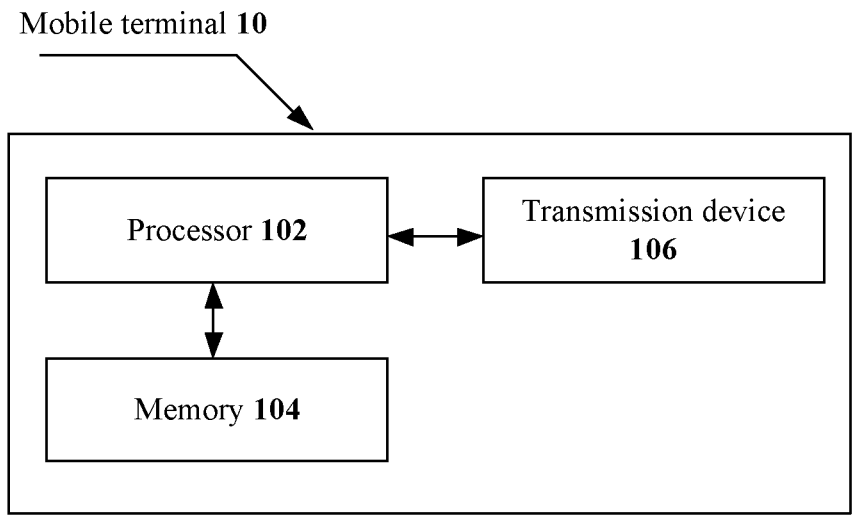
FIG. 1 is a block diagram of hardware of a mobile terminal implementing a method for sending information according to an embodiment of the present disclosure.

A method embodiment provided by the embodiment 1 of the present application may be executed in a mobile terminal, a computer terminal or other similar arithmetic devices. Taking the method to be executed in the mobile terminal as an example, FIG. 1 is a block diagram of hardware of a mobile terminal implementing a method for sending information according to an embodiment of the present disclosure. As shown in FIG. 1, a mobile terminal 10 may include one or more (only one is shown in FIG. 1) processors 102 (the processor 102 may include, but is not limited to, a microprocessor MCU, a programmable logic device such as FPGA or other processing devices), a memory 104 used for storing data, and a transmission device 106 used for implementing a communication function. It will be understood by a person having ordinary skill in the art that the structure shown in FIG. 1 is merely illustrative, and not intended to limit the structure of the electronic device described above. For example, the mobile terminal 10 may include more or fewer components than the components shown in FIG. 1, or has a configuration different from the configuration shown in FIG. 1.

The memory 104 may be used for storing software programs and modules of application software, such as program instructions/modules corresponding to the method for sending information in the embodiments of the present disclosure. The processor 102 executes the software programs and modules stored in the memory 104 so as to perform various function applications and data processing, that is, the method described above. The memory 104 may include a high-speed random access memory and may further include a nonvolatile memory, such as one or more magnetic storage devices, a flash disk or other nonvolatile solid-state disks. In some examples, the memory 104 may further include memories which are remotely disposed with respect to the processor 102. These remote memories may be connected to the mobile terminal 10 via a network. Examples of such a network include, but are not limited to, the Internet, intranets, local area networks, mobile communication networks, and combinations thereof.

The transmission device 106 is used for receiving and sending data via a network. Specific examples of such a network may include a wireless network provided by a communication provider of the mobile terminal 10. In one example, the transmission device 106 includes a network interface controller (NIC), which may be connected to other network devices via a base station so as to communicate with the Internet. In one example, the transmission 106 may be a radio frequency (RF) module, which is used for communicating with the Internet in a wireless way.

Network architecture of the embodiments of the present disclosure includes: a terminal and a base station. The terminal sends uplink information to the base station.

Figure 2:
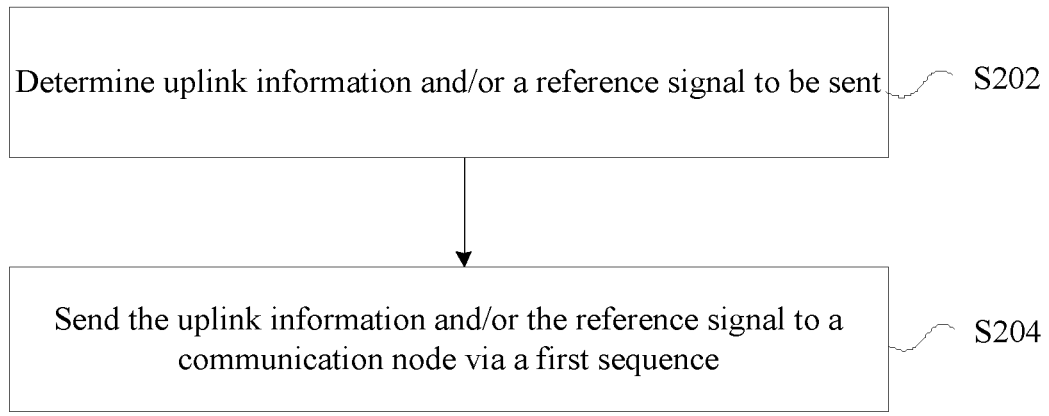
FIG. 2 is a flowchart of a method for sending information according to an embodiment of the present disclosure.

The present embodiment provides a method for sending information executed on the network architecture described above. FIG. 2 is a flowchart of a method for sending information according to an embodiment of the present disclosure. As shown in FIG. 2, the method includes the steps described below.

In step S202, uplink information and/or a reference signal to be sent is determined.

In step S204, the uplink information and/or the reference signal is sent to a communication node via a first sequence.

In the steps described above, uplink information and/or a reference signal is sent to a communication node via a first sequence. The sequence is used as the reference signal or used for directly carrying the uplink information. In such way, the disclosure has the advantages of a small cubic metric and a high efficiency of the power amplifier and provides a scheme of sending uplink information via a sequence in the comb transmission. When the sequence index used by a neighboring cell is different, the disclosure further reduces inter-cell interference and improves the overall performance of the system.

In an embodiment, the steps described above may be executed by a terminal, and the communication node may be a base station, but it is not limited thereto.

In an embodiment, the uplink information includes at least one of the following information: uplink control information and uplink data information. The uplink control information includes hybrid automatic transmission request (HARQ-ACK) information.

The scheme for sending information provided by embodiments of the present disclosure includes the following three types.

In a scheme 1, the uplink information is directly carried on the sequence and sent.

In a scheme 2, the uplink information, after modulated, is carried on the sequence and sent, and the reference signal is carried on the sequence and sent.

In a scheme 3, the uplink information, after modulated and encoded, is sent on a subcarrier corresponding to the uplink information of a symbol, and the reference signal is carried on the sequence and sent.

Detailed Examples are Given Below.

In an embodiment, the step in which uplink information is sent to a communication node via a first sequence includes: when a (information) number of the uplink information is not greater than (i.e., less than or equal to) 2, one or more first sequences having a length of M are sent on L subcarriers of K1 symbols. The uplink information is carried on the first sequence, $K1>=1$, L is an integer greater than or equal to 2, and $M<=L$.

In an embodiment, the step in which the uplink information and the reference signal are sent to the communication node via the first sequence includes: the uplink information and a reference signal corresponding to the uplink information are sent on L subcarriers of K2 symbols.

In an embodiment, the step in which the uplink control information and a reference signal corresponding to the uplink control information are sent on L subcarriers of K2 symbols includes: the modulated uplink control information is sent on M subcarriers of x symbols of the K2 symbols via a first sequence having a length of M, and the reference signal corresponding to the modulated uplink control information is sent on M subcarriers of K2-x symbols via a sequence having a length of M. M values of the first sequence are mapped to the M subcarriers, $K2>=2$, L is an integer greater than or equal to 2, (the value of L is a multiple of 3 or 12 for example), $M<=L$ and $0<x<K2$.

In an embodiment, the step in which the uplink control information and a reference signal corresponding to the uplink control information are sent on L subcarriers of K2 symbols includes: the encoded and modulated uplink control information is sent on M subcarriers of x symbols of the K2 symbols, and the reference signal corresponding to the uplink control information is sent on M subcarriers of K2-x symbols via a sequence having a length of M, where M values of the sequence are mapped to the M subcarriers, $K2>=2$, L is an integer greater than or equal to 2, $0<x<K2$ and $M<=L$.

In an embodiment, the value of L is a multiple of 3 or 12.

In an embodiment, the first sequence is one subset of a set of sequences having a length of M.

The set of sequences includes 30 sequences and the 30 sequences satisfy at least one of the following conditions:

different cyclic shifts of each sequence are orthogonal to each other;

a cubic metric (CM) value of each sequence does not exceed a first CM preset value;

a peak-to-average power ratio (PAPR) value of each sequence does not exceed a first PAPR preset value; and a cross-correlation between any two sequences does not exceed a first cross-correlation preset value.

M corresponds to the number of subcarriers used for the uplink information or the reference signal, and M=6.

In an embodiment, any of sequences $x_i(n)$ of the set of sequences is represented by the following formula:

$$x_i(n)=\exp(j\pi\varphi(n)/4),$$

where i denotes a sequence index, n=0,1, ..., L−1, values of i and $\varphi(n)$ are in a preset correspondence relationship as shown in Table 1, the value of $\varphi(n)$ is determined by a sequence or a cyclic shift of the sequence in each row in Table 1. It is noted that, the sequence index is only used for distinguishing different sequences, and the correspondence relationship between i and $\varphi(n)$ is not limited to Table 1. For example, the sequence index i=0 corresponds to $\varphi(n)=\{1, 1, 1, −1, 3, −3\}$ and the sequence index i=1 corresponds to $\varphi(n)=\{1, 1, 1, −1, −3, 1\}$. In practice, the sequence index i=0 corresponding to $\varphi(n)=\{1, 1, 1, −1, −3, 1\}$ and the sequence index i=1 corresponding to $\varphi(n)=\{1, 1, 1, −1, 3, −3\}$ is also within the scope of the present disclosure. The same applies to the entire application and will not be repeated hereafter.

TABLE 1

| i | $\varphi(0)$ | $\varphi(1)$ | $\varphi(2)$ | $\varphi(3)$ | $\varphi(4)$ | $\varphi(5)$ |
|---|---|---|---|---|---|---|
| 0 | 1 | 1 | 1 | −1 | 3 | −3 |
| 1 | 1 | 1 | 1 | −1 | −3 | 1 |
| 2 | 1 | 1 | 1 | 3 | −1 | −3 |
| 3 | 1 | 1 | 1 | 3 | −3 | 1 |
| 4 | 1 | 1 | 1 | −3 | 1 | −1 |
| 5 | 1 | 1 | 1 | −3 | 1 | 3 |
| 6 | 1 | 1 | 1 | −3 | −1 | 3 |
| 7 | 1 | 1 | 1 | −3 | 3 | −1 |
| 8 | 1 | 1 | −1 | 1 | 1 | −3 |
| 9 | 1 | 1 | −1 | 1 | −1 | 3 |
| 10 | 1 | 1 | −1 | −1 | 3 | −1 |
| 11 | 1 | 1 | −1 | 3 | −1 | −1 |
| 12 | 1 | 1 | −1 | 3 | −3 | −1 |
| 13 | 1 | 1 | −1 | −3 | 1 | −3 |
| 14 | 1 | 1 | −1 | −3 | −1 | 1 |
| 15 | 1 | 1 | 3 | 1 | 3 | −1 |
| 16 | 1 | 1 | 3 | −1 | 3 | 3 |
| 17 | 1 | 1 | 3 | −1 | −3 | 3 |
| 18 | 1 | 1 | 3 | 3 | −1 | 3 |
| 19 | 1 | 1 | 3 | −3 | 1 | −3 |
| 20 | 1 | 1 | 3 | −3 | 3 | 1 |
| 21 | 1 | 1 | −3 | 1 | −1 | 1 |
| 22 | 1 | 1 | −3 | 1 | −1 | −1 |
| 23 | 1 | 1 | −3 | 1 | 3 | 3 |
| 24 | 1 | 1 | −3 | −1 | 1 | −1 |
| 25 | 1 | 1 | −3 | −1 | −3 | −1 |
| 26 | 1 | 1 | −3 | 3 | 1 | 3 |
| 27 | 1 | 1 | −3 | 3 | −3 | 3 |
| 28 | 1 | 1 | −3 | −3 | 1 | −3 |
| 29 | 1 | 1 | −3 | −3 | 3 | −3 |

The first CM preset value is 1.2, the first PAPR preset value is 3.76, and the first cross-correlation preset value is 0.9310.

In an embodiment, the first sequence is one subset of a set of sequences having a length of M.

The set of sequences includes 14 sequences and the 14 sequences satisfy at least one of the following conditions:

different cyclic shifts of each sequence are orthogonal to each other;

a cubic metric (CM) value of each sequence does not exceed a second CM preset value;

a peak-to-average power ratio (PAPR) value of each sequence does not exceed a second PAPR preset value; and a cross-correlation between any two sequences does not exceed a second cross-correlation preset value.

M corresponds to a number of subcarriers used for the uplink information or the reference signal, and M=6.

In an embodiment, any of sequences $x_i(n)$ of the set of sequences is represented by the following formula:

$$x_i(n)=\exp(j\pi\varphi(n)/4),$$

where i denotes a sequence index, n=0,1, ..., M−1, values of i and $\varphi(n)$ are in a preset correspondence relationship as shown in Table 2, the value of $\varphi(n)$ is determined by a sequence or a cyclic shift of the sequence in each row in Table 2.

TABLE 2

| i | $\varphi(0)$ | $\varphi(1)$ | $\varphi(2)$ | $\varphi(3)$ | $\varphi(4)$ | $\varphi(5)$ |
|---|---|---|---|---|---|---|
| 0 | −3 | 1 | −1 | 3 | −3 | 1 |
| 1 | 3 | 1 | −1 | 3 | −3 | −1 |
| 2 | −1 | 3 | −3 | −3 | −1 | 3 |
| 3 | −1 | 1 | −3 | 3 | −1 | 1 |
| 4 | 1 | 3 | 1 | −3 | 3 | 1 |
| 5 | 1 | 3 | 1 | −1 | 1 | 3 |
| 6 | −1 | 3 | −1 | −3 | −3 | −3 |
| 7 | 1 | 1 | −3 | 3 | −1 | 3 |
| 8 | −1 | 1 | 1 | 3 | −1 | 1 |
| 9 | 1 | −3 | 1 | −1 | 3 | 3 |
| 10 | 3 | 1 | −1 | 3 | 1 | 3 |
| 11 | −3 | 1 | −3 | −3 | −3 | 1 |
| 12 | −3 | 1 | 1 | 1 | −3 | −3 |
| 13 | −3 | −3 | 1 | 1 | 1 | −3 |

The second CM preset value is 3, the second PAPR preset value is 5.3, and the second cross-correlation preset value is 0.75.

In an embodiment, the first sequence is one subset of a set of sequences having a length of M.

The set of sequences includes 14 sequences and the 14 sequences satisfy at least one of the following conditions:

different cyclic shifts of each sequence are orthogonal to each other;

a cubic metric (CM) value of each sequence does not exceed a third CM preset value;

a peak-to-average power ratio (PAPR) value of each sequence does not exceed a third PAPR preset value;

a cross-correlation between any two sequences does not exceed a third cross-correlation preset value; and a cross-correlation between each sequence and a first existing sequence (the first existing sequence is different from the first sequence and the existing sequence may be a known or existing sequence) having a length of 12 does not exceed a fourth preset value M corresponds to a number of subcarriers used for the uplink information or the reference signal.

In an embodiment, any of sequences $x_i(n)$ of the set of sequences is represented by the following formula:

$$x_i(n)=\exp(j\pi\varphi(n)/4),$$

where i denotes a sequence index, n=0,1, ..., M−1, values of i and $\varphi(n)$ are in a preset correspondence relationship as shown in Table 3, the value of $\varphi(n)$ is determined by a sequence or a cyclic shift of the sequence in each row in Table 3.

TABLE 3

| i | φ(0) | φ(1) | φ(2) | φ(3) | φ(4) | φ(5) |
|---|---|---|---|---|---|---|
| 0 | 3 | 3 | −1 | 1 | −3 | 3 |
| 1 | 3 | 1 | 3 | −1 | −1 | −3 |
| 2 | −1 | 3 | 1 | 1 | 3 | −3 |
| 3 | 3 | −1 | −3 | −1 | −1 | −3 |
| 4 | −3 | −1 | 1 | 3 | 1 | −1 |
| 5 | −3 | 1 | −3 | −3 | −1 | −3 |
| 6 | 3 | 3 | −1 | 3 | 3 | −3 |
| 7 | 1 | −3 | 1 | −1 | −1 | 3 |
| 8 | −1 | −3 | 3 | 1 | −1 | 1 |
| 9 | 1 | 3 | 3 | 1 | 1 | −1 |
| 10 | −1 | −3 | −3 | −1 | −1 | 1 |
| 11 | 1 | −3 | 1 | 1 | −1 | 1 |
| 12 | 3 | 1 | 3 | 3 | −1 | −3 |
| 13 | −1 | −1 | 3 | 3 | −3 | 1 |

The third CM preset value is 2.6, the third PAPR preset value is 5, the third cross-correlation preset value is 0.8, and the fourth cross-correlation preset value is 0.94.

The first existing sequence $y_i(n)$ is represented by the following formula:

$$y_i(n) = \exp(j\pi\varphi(n)/4),$$

where i denotes a sequence index, n=0,1, ..., 11, values of i and φ(n) are in a preset correspondence relationship as shown in Table 4 or Table 5, the value of φ(n) is determined by a sequence or a cyclic shift of the sequence in each row in Table 4 or Table 5.

TABLE 4

| i | φ(0), ..., φ(11) |
|---|---|
| 0 | −1  1  3 −3  3  3  1  1  3  1 −3  3 |
| 1 | 1  1  3  3  3 −1  1 −3 −3  1 −3  3 |
| 2 | 1  1 −3 −3 −3 −1 −3 −3  1 −3  1 −1 |
| 3 | −1  1  1  1  1 −1 −3 −3  1 −3  3 −1 |
| 4 | −1  3  1 −1  1 −1 −3 −1  1 −1  1  3 |
| 5 | 1 −3  3 −1 −1  1  1 −1 −1  3 −3  1 |
| 6 | −1  3 −3 −3 −3  3  1 −1  3  3 −3  1 |
| 7 | −3 −1 −1 −1  1 −3  3 −1  1 −3  3  1 |
| 8 | 1 −3  3  1 −1 −1 −1  1  1  3 −1  1 |
| 9 | 1 −3 −1  3  3 −1 −3  1  1  1  1  1 |
| 10 | −1  3 −1  1  1 −3 −3 −1 −3 −3  3 −1 |
| 11 | 3  1 −1 −1  3  3 −3  1  3  1  3  3 |
| 12 | 1 −3  1  1 −3  1  1  1 −3 −3 −3  1 |
| 13 | 3  3 −3  3 −3  1  1  3 −1 −3  3  3 |
| 14 | −3  1 −1 −3 −1  3  1  3  3  3 −1  1 |
| 15 | 3 −1  1 −3 −1 −1  1  1  3  1 −1 −3 |
| 16 | 1  3  1 −1  1  3  3  3 −1 −1  3 −1 |
| 17 | −3  1  1  3 −3  3 −3 −3  3  1  3 −1 |
| 18 | −3  3  1  1 −3  1 −3 −3 −1 −1  1 −3 |
| 19 | −1  3  1  3  1 −1 −1  3 −3 −1 −3 −1 |
| 20 | −1 −3  1  1  1  1  3  1 −1  1 −3 −1 |
| 21 | −1  3 −1  1 −3 −3 −3 −3 −3  1 −1 −3 |
| 22 | 1  1 −3 −3 −3 −3 −1  3 −3  1 −3  3 |
| 23 | 1  1 −1 −3 −1 −3  1 −1  1  3 −1  1 |
| 24 | 1  1  3  1  3  3 −1  1 −1 −3 −3  1 |
| 25 | 1 −3  3  3  1  3  3  1 −3 −1 −1  3 |
| 26 | 1  3 −3 −3  3 −3  1 −1 −1  3 −1 −3 |
| 27 | −3 −1 −3 −1  3  1 −1  1  3 −3  3 |
| 28 | −1  1 −3 −3  1  3  3 −3  3  3 −1 −1 |
| 29 | 3 −3 −3 −1 −1 −3 −1  3  3  3  1 −1 |

TABLE 5

| i | φ(0), ..., φ(11) |
|---|---|
| 0 | 1 −1  3  1  1 −1 −1 −1  1  3 −3  1 |
| 1 | −1 −1 −1  1  1 −3  1  3  3 −1 −3  1 |
| 2 | −3  1 −3 −3 −3  3 −3 −1  1  1  1 −3 |
| 3 | −3  3  1  3 −3  1  1  1  3 −3  3 |
| 4 | −3  1  3 −1 −1 −3 −3 −1 −1  3  1 −3 |

TABLE 5-continued

| i | φ(0), ..., φ(11) |
|---|---|
| 5 | −1  1  1 −1  1  3  3 −1 −1 −3  1 −3 |
| 6 | −3 −3 −1  3  3  3 −3  3  1 −1  3 |
| 7 | −3  3 −3  3  3 −3 −1 −1  3  3  1 −3 |
| 8 | −3 −1 −3 −1 −1 −3  3  3 −1 −1  1 −3 |
| 9 | −3  3  3  3 −1 −3 −3 −1 −3  1  3 −3 |
| 10 | 1  3 −3  1  3  3  3  1 −1  1 −1  3 |
| 11 | −1 −3  3 −1  3 −3 −3 −1  1 −1  1 −3 |
| 12 | 3  1  3  1  3 −3 −1  1  3  1 −1 −3 |
| 13 | −3 −3  3  3  3 −3 −1  1 −3  3  1 −3 |
| 14 | −3 −1  1 −3  1  3  3  3 −1 −3  3  3 |
| 15 | −3 −3  3  1 −3 −3 −1  3 −1  1  3 |
| 16 | −1  1  3 −3  1 −1  1 −1 −1 −3  1 −1 |
| 17 | −3 −1 −1  1  3  1  1 −1  1 −1 −3  1 |
| 18 | −3 −1  3 −3 −3 −1 −3  1 −1 −3  3  3 |
| 19 | −3 −3  3 −3  1  3  3 −1 −3  1  3 |
| 20 | −3  1 −1 −1  3  3 −3 −1 −3 −1 −3 |
| 21 | −3  1  3 −3 −1 −1 −3  3  3 −3  3 −3 |
| 22 | −3 −1 −1 −3 −3 −1 −3  3  1  3 −1  3 |
| 23 | −3 −1  3  1 −3 −1 −3  3  1  3  3  1 |
| 24 | −3  3  3  1 −3  3 −1  1  3 −3  3 −3 |
| 25 | 3 −1 −3  3 −3 −1  3  3  3 −3 −1 −3 |
| 26 | 1 −1  3 −1 −1 −1 −3 −1  1  1  1 −3 |
| 27 | −3  3  1 −3  1  3 −1 −1  1  3  3 |
| 28 | −3  3 −3  3 −3 −3  3 −1 −1  1  3 −3 |
| 29 | −3  3  1 −1  3  3 −3  1 −1  1 −1  1 |

In an embodiment, the first sequence is one subset of a set of sequences having a length of M. The set of sequences includes 30 sequences and the 30 sequences satisfy at least one of the following conditions:

different cyclic shifts of each sequence are orthogonal;

a cubic metric (CM) value of each sequence does not exceed a fourth CM preset value;

a peak-to-average power ratio (PAPR) value of each sequence does not exceed a fourth PAPR preset value;

a cross-correlation between any two sequences does not exceed a fifth cross-correlation preset value; and a cross-correlation between each sequence and a second existing sequence having a length of 12 does not exceed a sixth preset value.

M corresponds to a number of subcarriers used for the uplink information or the reference signal, and M=12.

In an embodiment, any of sequences $x_i(n)$ of the set of sequences is represented by the following formula:

$$x_i(n) = \exp(j\pi\varphi(n)/4),$$

where i denotes a sequence index, n=0,1, ..., M−1, values of i and φ(n) are in a preset correspondence relationship as shown in Table 6, the value of φ(n) is determined by a sequence or a cyclic shift of the sequence in each row in Table 6.

TABLE 6

| i | φ(0), ..., φ(11) |
|---|---|
| 0 | 1  1  1  1 −1  3 −1  3 −3  1  1 −3 |
| 1 | 1  1 −3  3  3  1  3  1 −3 −1  1 |
| 2 | 1  1 −1 −1 −1 −1  1  3  1  3  1 −3 |
| 3 | 1  1  1  1  3 −1  3 −1 −3  1  1 −3 |
| 4 | 1  1  3 −1  1  1 −3  1 −3 −3  3 −1 |
| 5 | 1  1  1  3 −1 −3  1  3  1  1  3 |
| 6 | 1  1 −1  1  3 −1 −1  3  1 −3  1 |
| 7 | 1  1  3 −3  3 −3  1  3  1 −3  1 |
| 8 | 1 −3 −3  1  3  3  3  3 −1  3 −1 |
| 9 | 1  1  1  3 −3 −3  1  3 −1  3  1 −1 |
| 10 | 1  1  1 −3  1 −1  1 −3  1  3 −3 |
| 11 | 1  1 −3 −3 −3 −1  1 −3  3 −1  1 |
| 12 | 1  1 −3  1 −3  1 −3  1  1  1  1 |
| 13 | 1  1 −1 −3 −1  1  1 −3  1  3 −3  3 |
| 14 | 1  1 −3  3  1 −3  1 −3 −1  3  3  1 |

TABLE 6-continued

| i | φ(0), . . . , φ(11) | | | | | | | | | | | |
|---|---|---|---|---|---|---|---|---|---|---|---|---|
| 15 | 1 | 1 | 1 | 1 | 3 | −1 | −1 | 3 | 1 | −3 | −1 | 3 |
| 16 | 1 | 1 | 1 | 3 | 3 | 1 | −1 | 3 | −1 | −1 | 3 | −3 |
| 17 | 1 | 1 | −3 | 1 | −1 | −3 | −1 | 3 | −1 | −1 | −1 | 1 |
| 18 | 1 | 1 | 3 | 3 | −3 | 3 | 1 | 1 | 3 | −1 | 1 | −3 |
| 19 | 1 | 1 | 1 | −3 | −1 | 3 | −1 | 3 | 1 | −1 | 3 | 3 |
| 20 | 1 | 1 | 3 | −1 | −1 | −1 | 1 | −1 | 1 | −3 | 3 | 1 |
| 21 | 1 | 1 | 1 | 3 | 3 | −1 | 3 | 3 | 1 | −1 | 1 | −3 |
| 22 | 1 | 1 | 1 | 3 | −1 | −1 | 3 | 1 | −1 | 1 | −3 | 3 |
| 23 | 1 | 1 | 1 | 3 | 3 | −1 | 1 | −3 | −3 | 3 | −1 | 3 |
| 24 | 1 | 1 | 1 | 1 | −3 | 1 | −3 | 1 | −3 | −3 | 1 | 1 |
| 25 | 1 | 1 | 3 | −1 | −1 | 3 | 1 | −1 | 3 | −3 | 3 | −3 |
| 26 | 1 | 1 | 1 | 3 | −3 | −3 | 3 | 1 | 3 | −1 | 3 | 1 |
| 27 | 1 | 1 | −3 | −3 | −1 | 3 | −1 | 1 | −1 | 1 | 1 | −1 |
| 28 | 1 | 1 | −1 | −1 | 3 | −3 | 1 | −1 | 3 | 3 | −3 | −3 |
| 29 | 1 | 1 | −3 | −3 | 1 | −1 | −1 | 1 | −1 | 3 | −1 | 3 |

The fourth CM preset value is 0.68, the fourth PAPR preset value is 2.8, the fifth cross-correlation preset value is 0.74, and the sixth cross-correlation preset value is 0.825.

The second existing sequence $y_i(n)$ is represented by a following formula:

$$y_i(n)=\exp(j\pi\varphi(n)/4),$$

where i denotes a sequence index, n=0,1, . . . , 11, values of i and φ(n) are in a preset correspondence relationship as shown in Table 6, the value of φ(n) is determined by a sequence or a cyclic shift of the sequence in each row in Table 6.

In an embodiment, the first sequence is one subset of a set of sequences having a length of M.

The set of sequences includes 30 sequences and the 30 sequences satisfy at least one of the following conditions:
different cyclic shifts of each sequence are orthogonal;
a cubic metric (CM) value of each sequence does not exceed a fifth CM preset value;
a peak-to-average power ratio (PAPR) value of each sequence does not exceed a fifth PAPR preset value;
a cross-correlation between any two sequences does not exceed a sixth cross-correlation preset value; and
a cross-correlation between each sequence and a third existing sequence having a length of 18 does not exceed a seventh preset value M corresponds to a number of subcarriers used for the uplink information or the reference signal, and M=18.

In an embodiment, any of sequences $x_i(n)$ of the set of sequences is represented by the following formula:

$$x_i(n)=\exp(j\pi\varphi(n)/4),$$

where i denotes a sequence index, n=0,1, . . . , M−1, values of i and φ(n) are in a preset correspondence relationship as shown in Table 7, the value of φ(n) is determined by a sequence or a cyclic shift of the sequence in each row in Table 7.

TABLE 7

| i | φ(0), . . . , φ(17) | | | | | | | | | | | | | | | | | |
|---|---|---|---|---|---|---|---|---|---|---|---|---|---|---|---|---|---|---|
| 0 | −1 | −3 | 3 | 3 | 3 | 1 | 3 | 3 | 3 | −3 | −1 | 1 | 3 | −1 | 3 | −3 | 3 | −1 |
| 1 | 3 | 1 | −3 | 1 | −3 | 3 | 3 | −1 | −3 | −3 | −1 | −3 | −3 | 3 | −3 | −1 | 1 | 3 |
| 2 | −1 | 3 | 1 | 3 | 1 | 1 | 1 | −1 | 3 | 1 | 1 | −3 | −3 | 3 | −3 | −1 | 1 |
| 3 | 3 | 1 | 3 | 3 | 1 | 3 | 3 | −3 | −3 | 1 | 1 | 1 | −3 | 1 | −3 | −1 | −3 | 3 |
| 4 | −3 | −1 | −3 | −3 | 1 | 1 | −1 | −3 | −1 | −3 | −1 | −1 | 3 | 3 | −1 | 3 | 1 | 3 |
| 5 | 1 | −3 | −1 | −3 | 3 | 3 | −1 | −3 | 1 | −3 | −3 | −1 | −3 | −1 | 1 | 3 | 3 | 3 |
| 6 | 3 | −3 | −3 | −3 | 3 | 1 | −1 | 1 | −3 | 3 | 1 | −1 | 1 | 3 | −3 |
| 7 | 1 | 1 | −3 | 3 | 3 | 1 | 3 | −3 | 3 | −1 | 1 | 1 | −1 | 1 | −3 | −3 | −1 | 3 |
| 8 | 3 | −3 | 3 | −1 | 1 | 3 | −3 | −1 | −3 | −3 | −1 | −3 | 3 | 1 | −1 | 3 | −3 | 3 |
| 9 | −1 | 1 | −3 | 3 | −1 | 3 | 3 | 1 | −1 | −3 | −3 | 1 | 3 | 1 | 3 | 3 | 1 | 3 |
| 10 | 3 | 3 | 3 | −3 | −1 | −3 | −1 | 3 | −1 | 1 | −1 | −3 | 1 | −3 | −3 | −1 | 3 | 3 |
| 11 | 1 | 1 | −3 | −3 | −3 | −3 | 1 | 3 | −3 | 3 | 3 | 1 | −3 | −1 | 3 | −1 | −3 | 1 |
| 12 | 1 | 1 | −3 | −1 | 3 | 3 | −3 | 1 | −3 | 1 | −3 | −3 | 1 | −1 | 3 | 3 | 3 | 3 |
| 13 | −1 | −3 | 1 | −3 | −3 | −3 | 1 | 1 | 3 | 3 | −3 | 3 | 3 | −3 | −1 | 3 | −3 | 1 |
| 14 | 1 | 1 | 1 | −1 | −1 | 3 | 1 | −3 | 3 | −1 | 1 | 3 | −1 | 1 | 1 |
| 15 | 3 | 3 | 1 | 3 | −3 | 3 | 3 | 1 | −1 | 3 | −1 | −3 | 3 | 3 | −3 | −1 | 1 | 1 |
| 16 | 3 | −1 | −1 | 1 | −3 | −1 | −3 | −1 | −3 | −1 | −3 | 1 | 1 | 1 | −3 | −3 | 3 |
| 17 | 3 | −3 | 1 | 1 | 3 | −1 | 1 | −1 | −1 | −3 | 1 | 1 | −1 | 3 | 3 | −3 | 3 | −1 |
| 18 | −3 | 3 | −1 | 1 | 1 | 3 | −1 | −3 | 3 | −1 | −1 | −3 | −1 | −3 | −3 | −1 | −3 |
| 19 | 1 | 3 | −1 | −1 | −1 | −1 | −3 | 1 | −3 | −1 | 1 | −1 | −3 | 1 | 1 | 1 | −3 | 3 |
| 20 | −3 | −1 | 3 | −3 | 1 | 3 | 1 | −1 | −1 | −3 | 1 | −1 | −3 | −3 | −1 | −1 | 1 | −1 |
| 21 | −3 | 1 | 1 | −3 | 1 | 1 | 3 | −3 | −1 | −3 | −1 | 3 | −3 | 3 | −1 | −1 | −1 | −3 |
| 22 | −1 | −3 | −1 | 1 | 3 | −3 | −3 | 3 | 1 | 1 | −3 | −3 | 3 | −3 | −1 | −3 | 1 | −3 |
| 23 | −3 | −3 | −3 | 3 | 3 | −3 | −3 | 1 | 1 | −1 | 3 | −3 | 3 | −1 | 3 | −1 | −1 | 3 |
| 24 | −1 | 1 | −3 | 1 | 3 | 1 | 1 | −1 | 3 | −1 | −1 | 1 | 3 | 3 | −1 | −3 | 3 |
| 25 | 1 | 1 | −1 | −1 | −3 | −1 | 1 | −3 | −3 | −3 | 1 | −3 | −1 | −1 | 1 | −1 | 3 | 1 |
| 26 | 3 | −1 | −3 | −1 | −3 | −3 | 3 | 3 | −1 | 1 | −3 | −1 | 3 | 1 | 1 | 3 | 3 |
| 27 | 3 | −1 | 3 | 1 | −3 | −3 | −1 | 1 | −3 | −3 | 3 | 3 | 1 | 3 | −3 | 3 | −3 |
| 28 | −1 | 3 | −1 | −3 | 3 | 1 | −3 | −1 | 3 | −3 | −1 | −1 | 1 | 1 | −1 | −1 | −1 |
| 29 | −3 | 3 | 1 | −1 | 3 | 3 | −3 | 1 | −3 | 1 | 3 | −3 | −3 | 3 | −3 | 1 | 1 |

The fifth CM preset value is 0.6, the fourth PAPR preset value is 2.9, the sixth cross-correlation preset value is 0.6, and the seventh cross-correlation preset value is 0.7.

The third existing sequence $y_i(n)$ having the length of 18 is represented by the following formula:

$$y_i(n)=\exp(j\pi\varphi(n)/4),$$

where i denotes a sequence index, n=0,1, . . . , 17, values of i and φ(n) are in a preset correspondence relationship as shown in Table 8, the value of φ(n) is determined by a sequence or a cyclic shift of the sequence in each row in Table 8.

TABLE 8

| i | φ(0), ..., φ(17) |
|---|---|
| 0 | -3 -3 -3 -3 -3 -1 1 -1 -3 3 -1 3 -1 3 -3 -1 -1 3 |
| 1 | -3 -3 -3 -3 -3 -1 1 -1 1 -3 -3 -3 1 -1 3 -3 -3 1 |
| 2 | -3 -3 -3 -3 -3 -1 1 1 3 -3 1 1 -3 1 -3 3 1 -1 |
| 3 | -3 -3 -3 -3 -3 -1 1 3 -3 -1 3 -1 3 1 -1 -3 3 -3 |
| 4 | -3 -3 -3 -3 -3 -1 3 -3 -1 1 -1 -3 3 3 1 -3 1 -1 |
| 5 | -3 -3 -3 -3 1 -3 -3 -3 -3 1 1 1 -3 1 1 -3 -3 |
| 6 | -3 -3 -3 -3 1 -3 -3 1 1 -3 -3 1 -1 3 -3 -1 3 |
| 7 | -3 -3 -3 -3 1 -3 -1 3 -1 3 3 -1 -1 1 3 3 -1 |
| 8 | -3 -3 -3 -3 1 -1 -1 -1 -3 3 -1 3 -3 3 -1 1 3 |
| 9 | -3 -3 -3 -3 3 -3 1 -1 3 -3 3 3 -1 -3 1 1 -3 |
| 10 | -3 -3 -3 -3 3 -1 -3 -1 1 1 3 -3 -1 3 -1 3 1 |
| 11 | -3 -3 -3 -3 3 3 -1 -1 -1 3 1 -3 3 -1 1 -3 1 |
| 12 | -3 -3 -3 -1 -3 -3 -3 1 3 1 -1 3 -3 -1 -3 1 1 |
| 13 | -3 -3 -3 -1 -3 -3 1 -1 -1 3 -3 -3 1 3 1 -3 1 |
| 14 | -3 -3 -3 -1 -3 -3 1 3 -3 -1 3 1 3 -1 3 -3 |
| 15 | -3 -3 -3 -1 -3 -1 3 -3 1 -3 1 -1 -3 -3 1 1 3 |
| 16 | -3 -3 -3 -1 -1 3 -3 3 -1 -3 1 1 -1 -3 -1 3 -3 |
| 17 | -3 -3 -3 -1 -1 3 -1 -3 1 3 -1 -3 -3 1 3 -1 1 |
| 18 | -3 -3 -3 -1 3 -1 -1 3 3 -1 -3 1 1 1 -3 -1 |
| 19 | -3 -3 -3 -1 3 1 -3 -1 -3 3 1 -1 3 -1 1 3 -1 |
| 20 | -3 -3 -3 1 -3 -3 3 1 1 -3 -1 1 3 3 -1 3 -1 |
| 21 | -3 -3 -3 1 -3 1 3 1 -1 -1 3 3 -1 1 1 -3 3 |
| 22 | -3 -3 -3 1 -3 3 -3 -1 3 1 1 -1 1 3 3 -1 3 |
| 23 | -3 -3 -3 1 -3 3 -1 3 -3 -1 -1 1 -3 -3 3 1 |
| 24 | -3 -3 -3 1 1 3 1 1 -1 3 1 1 3 -1 -3 1 3 |
| 25 | -3 -3 -3 1 3 3 3 1 -3 1 -3 -3 3 -3 1 -1 -3 |
| 26 | -3 -3 -3 3 1 3 3 -1 3 -3 -3 3 -1 -3 -1 1 |
| 27 | -3 -3 -3 -1 -3 -1 -1 -3 3 3 1 -3 -1 3 1 -3 |
| 28 | -3 -3 -3 -1 -3 1 -1 1 -3 3 1 -3 -1 1 3 1 -1 -1 |
| 29 | -3 -3 -3 -1 -3 3 1 1 -1 -1 1 3 1 -3 1 -3 -1 1 |

In an embodiment, the first sequence is one subset of a set of sequences having a length of M. The set of sequences includes 30 sequences and the 30 sequences satisfy at least one of the following conditions:

different cyclic shifts of each sequence are orthogonal;

a cubic metric (CM) value of each sequence does not exceed a sixth CM preset value;

a peak-to-average power ratio (PAPR) value of each sequence does not exceed a sixth PAPR preset value;

a cross-correlation between any two sequences does not exceed an eighth cross-correlation preset value; and a cross-correlation between each sequence and a fourth existing sequence having a length of 24 does not exceed a ninth preset value.

M corresponds to a number of subcarriers used for the uplink information or the reference signal, and M=24.

In an embodiment, any of sequences $x_i(n)$ of the set of sequences is represented by the following formula:

$$x_i(n) = \exp(j\pi\varphi(n)/4),$$

where i denotes a sequence index, n=0,1, ..., M−1, values of i and φ(n) are in a preset correspondence relationship as shown in Table 9, the value of φ(n) is determined by a sequence or a cyclic shift of the sequence in each row in Table 9.

TABLE 9

| i | φ(0), ..., φ(23) |
|---|---|
| 0 | -3 1 -3 3 -1 1 3 3 1 -1 -3 -1 1 -1 1 -3 -1 1 1 1 3 3 -1 |
| 1 | 3 -1 3 -1 -3 -3 -1 3 -1 -3 -3 1 -1 -1 -1 1 -3 3 3 -3 -1 1 -3 -3 |
| 2 | 1 3 3 3 1 -3 3 3 1 -3 -1 -1 -1 3 3 -1 3 1 -3 -1 -1 -3 1 3 |
| 3 | -3 -1 3 1 1 1 -3 3 1 -3 3 1 1 1 1 3 -3 -1 1 -3 3 -3 1 |
| 4 | 1 3 -3 -3 -3 3 1 -1 -1 1 3 -3 1 -3 -3 3 3 3 -3 3 1 -3 1 3 |
| 5 | 1 1 1 -1 1 3 3 1 -1 1 -3 1 -3 -3 -3 1 3 3 -1 -1 1 |
| 6 | -1 3 3 3 1 -1 1 -1 1 3 -1 -1 3 1 1 3 3 -1 3 -1 -3 -3 -1 |
| 7 | -1 -1 -1 -1 1 3 -1 1 -3 1 -1 3 3 -1 3 1 -3 -1 -1 1 -1 -3 -3 3 |
| 8 | -3 3 3 3 -3 -1 1 -1 3 -1 -1 -3 -3 3 -1 -3 1 -3 -1 3 -3 -3 1 -1 |
| 9 | 1 -3 -3 -3 -1 1 1 1 3 -1 1 1 3 -1 3 1 -1 -3 -3 |
| 10 | 3 3 3 1 -3 1 -1 -3 -3 -1 -1 -1 3 -3 -3 -1 3 -1 -1 -3 1 3 -1 |
| 11 | 3 -1 -3 3 1 3 -3 3 -3 3 3 -3 -3 1 3 -1 -1 -1 1 -3 3 3 3 -1 |
| 12 | 3 1 -1 3 -1 1 -3 1 1 -1 -1 1 3 3 1 1 3 -3 -1 -1 -1 -3 3 -3 |
| 13 | 1 1 -1 -1 3 -1 3 3 -1 -3 3 1 1 3 -1 1 -3 -1 -1 |
| 14 | -1 3 -3 -1 3 1 1 -1 3 -1 -1 3 1 3 3 3 3 -1 -1 3 1 -1 |
| 15 | -3 1 -1 3 1 -3 -1 -3 -3 3 -3 -3 -1 1 -3 -3 3 -3 -1 -3 -1 1 |
| 16 | 3 -3 1 1 -1 -1 -3 3 -1 3 1 3 3 1 -1 3 1 -1 1 1 1 3 |
| 17 | -1 -3 -3 -3 3 -1 1 -3 1 3 3 1 3 3 1 -3 1 3 -3 -1 -1 3 |
| 18 | -1 -3 -3 3 -3 1 1 -1 3 1 -3 -3 -3 1 -3 -3 -3 -1 3 3 -1 |
| 19 | 3 -1 -1 -3 -3 -1 -1 -1 3 -3 3 -3 -3 -3 1 -3 3 1 -3 -3 -1 |
| 20 | -1 1 3 3 -3 -1 3 -1 -3 1 1 -1 3 1 1 1 -1 -1 3 -1 -3 3 |
| 21 | 1 -1 1 1 1 3 3 3 1 1 1 -1 -3 3 -1 -1 3 -1 3 -1 3 -3 -1 |
| 22 | -3 -3 -3 -3 3 -1 -1 -3 3 3 -1 3 -1 3 -1 1 3 -3 -1 3 -1 3 -3 |

TABLE 9-continued

| i | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 23 | -1 | -1 | -3 | -3 | 1 | 3 | 3 | 3 | 1 | -1 | -3 | -1 | 1 | 1 | 1 | 1 | -3 | 1 | 1 | 1 | 3 | -1 | -3 | 1 |
| 24 | -1 | 1 | 3 | -1 | -3 | 1 | -3 | -1 | -1 | -1 | 1 | 3 | 1 | -1 | 3 | 1 | 1 | 1 | -3 | -1 | -3 | -3 | -3 | 3 |
| 25 | 3 | 3 | 1 | -3 | -3 | -1 | -1 | 3 | 3 | 1 | 1 | 1 | -3 | 3 | -3 | 1 | 3 | -3 | 3 | 3 | -3 | 1 | -3 | 3 |
| 26 | -1 | 1 | -3 | -1 | 1 | 3 | 3 | -3 | 1 | 3 | 1 | 3 | -1 | -3 | -3 | 3 | 1 | -3 | 3 | 1 | -3 | 3 | 3 | 3 |
| 27 | -3 | 3 | -3 | 1 | -3 | 1 | -1 | -1 | 1 | -1 | -1 | -1 | -3 | 1 | -1 | -1 | 1 | 3 | -3 | -1 | -1 | -3 | 1 | 3 |
| 28 | -1 | 3 | -3 | -1 | -1 | -3 | -1 | 1 | 1 | 1 | 1 | -1 | -1 | -3 | 1 | 3 | -1 | -3 | -1 | -3 | 3 | -1 | -3 | 3 |
| 29 | -1 | 3 | -1 | 3 | -1 | 1 | 3 | -3 | 1 | 1 | -1 | -1 | -3 | 3 | -1 | -1 | 3 | 1 | -3 | -3 | -1 | -1 | -1 | -1 |

The fifth CM preset value is 0.64, the fourth PAPR preset value is 3.4, the sixth cross-correlation preset value is 0.55, and the seventh cross-correlation preset value is 0.62.

The fourth existing sequence $y_i(n)$ having the length of 24 is represented by the following formula:

$$y_i(n) = \exp(j\pi\varphi(n)/4),$$

where i denotes a sequence index, $n = 0, 1, \ldots, 23$, values of i and $\varphi(n)$ are in a preset correspondence relationship as shown in Table 10, the value of $\varphi(n)$ is determined by a sequence or a cyclic shift of the sequence in each row in Table 10.

TABLE 10

| i | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | 3 | 1 | -1 | -3 | -3 | 1 | -3 | -1 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | -1 | 1 | 1 | -3 | 1 | 3 | -1 | -3 | 3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | -1 | 1 | -3 | 1 | 1 | -3 | 1 | 3 | -3 | -1 | 1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

In an embodiment, the cyclic shift $y_i(n, \alpha)$ described above is represented by the following formula: $y_i(n,\alpha) = x_i(n)\exp(j \cdot 2\pi\alpha n/L)$, where $\alpha$ is a cyclic shift value, and $\alpha \in \{0, 1, 2, \ldots, L-1\}$.

In an embodiment, the sequence index i is determined according to a cell identifier, and the cyclic shift value $\alpha$ is determined according to an indication signaling of a base station. In an embodiment, the sequence index i and the cyclic shift value $\alpha$ are determined according to the indication signaling of the base station.

From the description of the embodiments described above, the method of any embodiment described above may be implemented by means of software plus a necessary general-purpose hardware platform, or may of course be implemented by hardware, but in many cases, the former is one implementation mode. Based on this understanding, the present disclosure substantially, or the part contributing to the related art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment 2

The present embodiment further provides an apparatus for sending information. The apparatus is used for implementing the above-mentioned embodiments. What has been described will not be repeated. As used below, the term "module" may be software, hardware or a combination thereof capable of implementing predetermined functions. The device in the embodiments described below is implemented by software, but implementation by hardware or by a combination of software and hardware is also possible and conceived.

Figure 3:
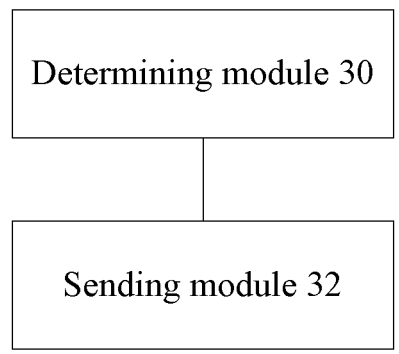
FIG. 3 is a block diagram of an apparatus for sending information according to an embodiment of the present disclosure.

FIG. 3 is a block diagram of an apparatus for sending information according to an embodiment of the present disclosure. As shown in FIG. 3, the apparatus includes a determining module 30 and a sending module 32.

The determining module 30 is configured to determine uplink information and/or a reference signal to be sent.

The sending module 32 is configured to send the uplink information and/or the reference signal to a communication node via a first sequence.

The various modules described above may be implemented by software or hardware. Implementation by hardware may, but may not necessarily, be performed by the following manners. The various modules described above are located in a same processor or their respective processors.

Embodiment 3

The present embodiment is an optional embodiment of the present disclosure. A detailed description of the present application is given below in conjunction with specific implementation modes.

Specific Embodiment 1

Figure 4:
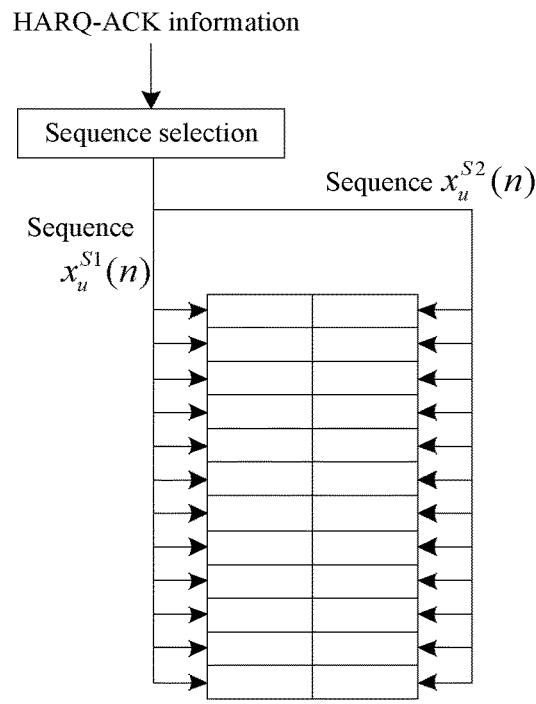
FIG. 4 is a schematic diagram illustrating information sending according to a specific embodiment 1 of the present disclosure.

FIG. 4 is a schematic diagram illustrating information sending according to a specific embodiment 1 of the present disclosure. As shown in FIG. 4, HARQ-ACK information is sent on 2 symbols, that is, K=2. When the number of HARQ-ACK information does not exceed 2 bits, selects one sequence $x_i^{S1}(n)$ or two sequences $x_i^{S1}(n)$ and $x_i^{S2}(n)$ by a sequence selector for the HARQ-ACK information of 1 bit or 2 bits. In the present embodiment, assuming that HARQ-ACK information of 2 bits needs to be sent, when one sequence $x_i^{S1}(n)$ is outputted by the sequence selector, the sequence $x_i^{S2}(n)$ will be determined according to a pre-defined manner in relation to the sequence $x_i^{S1}(n)$; otherwise, two sequences $x_i^{S1}(n)$ and $x_i^{S2}(n)$ are directly outputted by the sequence selector. The sequences $x_i^{S1}(n)$ and $x_i^{S2}(n)$ are respectively mapped to the 2 symbols. A sequence of a set of sequences $\{x_i(n)\}$ includes candidate sequences for the sequences $x_i^{S1}(n)$ and $x_i^{S2}(n)$. The sequence $x_i(n)$ satisfies:

$$x_i(n)=\exp(j\pi\varphi(n)/4),$$

where i denotes a sequence index, $\varphi(n)$ is a predetermined parameter, values of i and $\varphi(n)$ are shown in Tables 1/2/3/6/7/9, the value of $\varphi(n)$ is determined by a sequence or a cyclic shift of the sequence in Tables 1/2/3/6/7/9.

A terminal determines, according to frequency domain resources occupied by the uplink information to be sent, any one (corresponding to values of i in Tables 1-10, the same as below) of sequences in any of Tables 1/2/3/6/7/9, shown in examples given below:

when the terminal determines that 6 subcarriers in the frequency domain are occupied by the uplink information to be sent, any one (corresponding to values of i in tables) of sequences in any of Tables 1/2/3 is selected for the sending;

when the terminal determines that 12 subcarriers in the frequency domain are occupied by the uplink information to be sent, any one (corresponding to values of i in tables) of sequences in Table 6 is selected for the sending;

when the terminal determines that 18 subcarriers in the frequency domain are occupied by the uplink information to be sent, any one (corresponding to values of i in Tables) of sequences in Table 7 is selected for the sending; and when the terminal determines that 24 subcarriers in the frequency domain are occupied by the uplink information to be sent, any one (corresponding to values of i in tables) of sequences in Table 9 is selected for the sending.

The sequence index i is determined according to a cell identifier, and the cyclic shift value $\alpha$ is determined according to an indication signaling of a base station; or the sequence index i and the cyclic shift value $\alpha$ are determined according to the indication signaling of the base station.

Specific Embodiment 2

Figure 5:
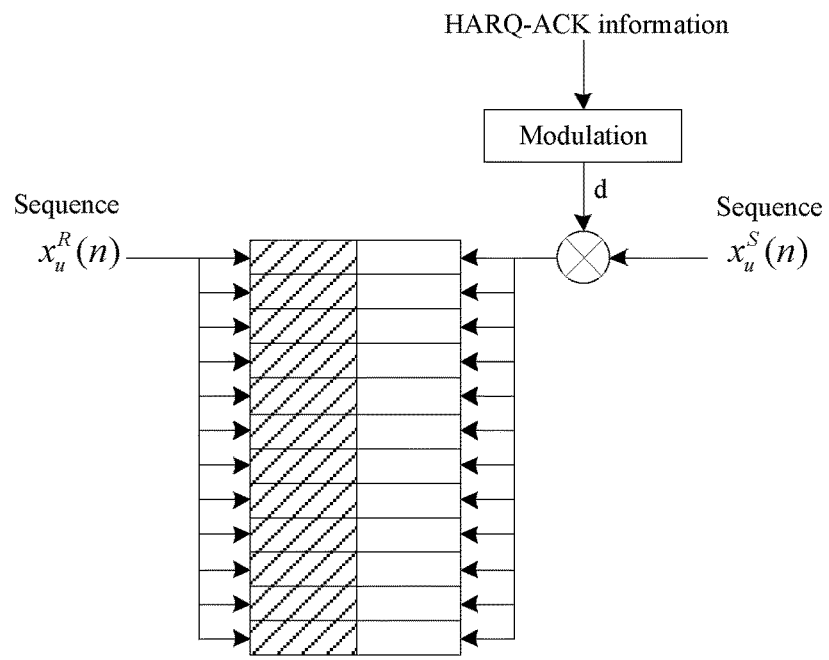
FIG. 5 is a schematic diagram illustrating information sending according to a specific embodiment 2 of the present disclosure.

FIG. 5 is a schematic diagram illustrating information sending according to a specific embodiment 2 of the present disclosure. As shown in FIG. 5, uplink information is sent on 2 symbols, that is, K=2. The first symbol is used for sending a reference signal and the second symbol is used for sending uplink control information. When the number of the uplink information does not exceed 2 bits, the uplink information of 1 bit or 2 bits, is modulated in a manner of BPSK or QPSK to acquire a modulated symbol d. The modulated symbol d is multiplied with a sequence $x_i^{S1}(n)$ and then is mapped to a symbol used for sending the uplink control information. The sequence $x_i^{R}(n)$ is directly mapped to the symbol for sending the reference signal. The sequence $x_i^{S}(n)$ and the sequence $x_i^{R}(n)$ have a same sequence index i. The sequence $x_i^{S}(n)$ and the sequence $x_i^{R}(n)$ may have the same cyclic shift or may have different cyclic shifts. Furthermore, the sequence $x_i^{S}(n)$ and the sequence $x_i^{R}(n)$ belong to a set of sequences $\{x_i(n)\}$. The sequence $x_i(n)$ satisfies:

$$x_i(n)=\exp(j\pi\varphi(n)/4),$$

where i denotes a sequence index, $\varphi(n)$ is a predetermined parameter, values of i and $\varphi(n)$ are shown in Tables 1/2/3/6/7/9, the value of $\varphi(n)$ is determined by a sequence or a cyclic shift of the sequence in each row in Tables 1/2/3/6/7/9.

A terminal determines, according to frequency domain resources occupied by the uplink information to be sent, any one (corresponding to values of i in tables) of sequences in any of Tables 1/2/3/6/7/9, shown in examples given below:

when the terminal determines that 6 subcarriers in the frequency domain are occupied by the uplink information to be sent, any one (corresponding to values of i in tables) of sequences in any of Tables 1/2/3 is selected for the sending;

when the terminal determines that 12 subcarriers in the frequency domain are occupied by the uplink information to be sent, any one (corresponding to values of i in tables) of sequences in Table 6 is selected for the sending;

when the terminal determines that 18 subcarriers in the frequency domain are occupied by the uplink information to be sent, any one (corresponding to values of i in tables) of sequences in Table 7 is selected for the sending; and when the terminal determines that 24 subcarriers in the frequency domain are occupied by the uplink information to be sent, any one (corresponding to values of i in tables) of sequences in Tables 9 is selected for the sending.

The sequence index i is determined according to a cell identifier, and the cyclic shift value $\alpha$ is determined according to an indication signaling of a base station; or the sequence index i and the cyclic shift value α are determined according to the indication signaling of the base station.

Specific Embodiment 3

Figure 6:
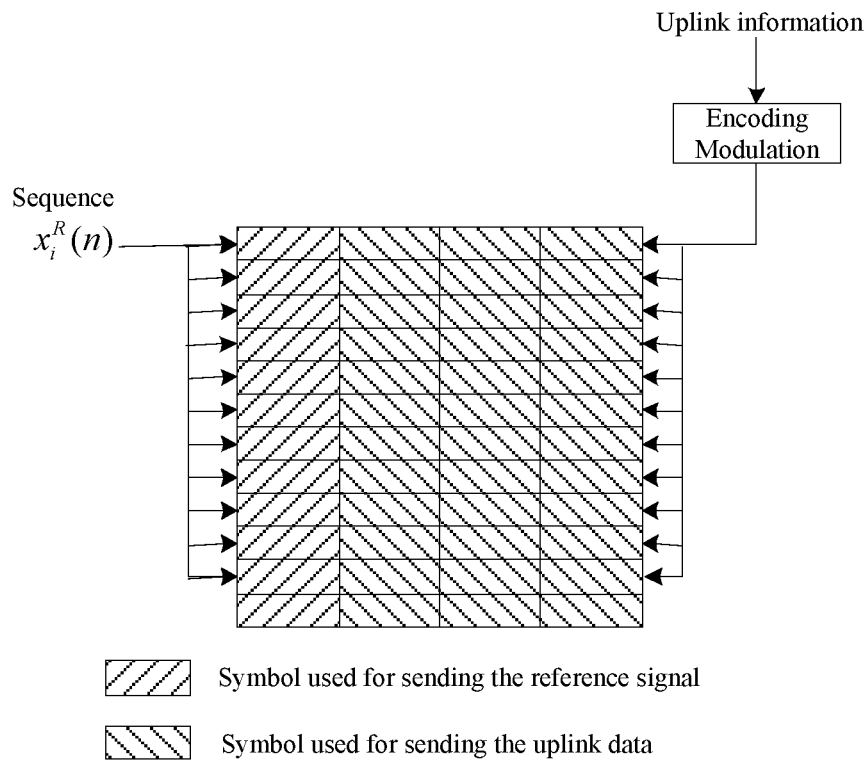
FIG. 6 is a schematic diagram illustrating information sending according to a specific embodiment 3 of the present disclosure.

FIG. 6 is a schematic diagram illustrating information sending according to a specific embodiment 3 of the present disclosure. As shown in FIG. 6, uplink information is sent on 4 symbols, that is, K=4. The first symbol is used for sending a reference signal and the last three symbols are used for sending uplink control information. The uplink information, after encoding, modulation, pre-coding and other operations, is mapped to a symbol used for sending the uplink information. The sequence $x_i^K(n)$ is directly mapped to a symbol used for sending the reference signal.

Furthermore, the sequence $x_i^S(n)$ and the sequence $x_i^R(n)$ belong to the set of sequences $\{x_i(n)\}$. The sequence $x_i(n)$ satisfies:

$$x_i(n)=\exp(j\pi\varphi(n)/4),$$

where i denotes a sequence index, φ(n) is a predetermined parameter, values of i and φ(n) are shown in Tables 1/2/3/6/7/9, the value of φ(n) is determined by a sequence or a cyclic shift of the sequence in each row in Tables 1/2/3/6/7/9.

Specific Embodiment 4

Figure 7:
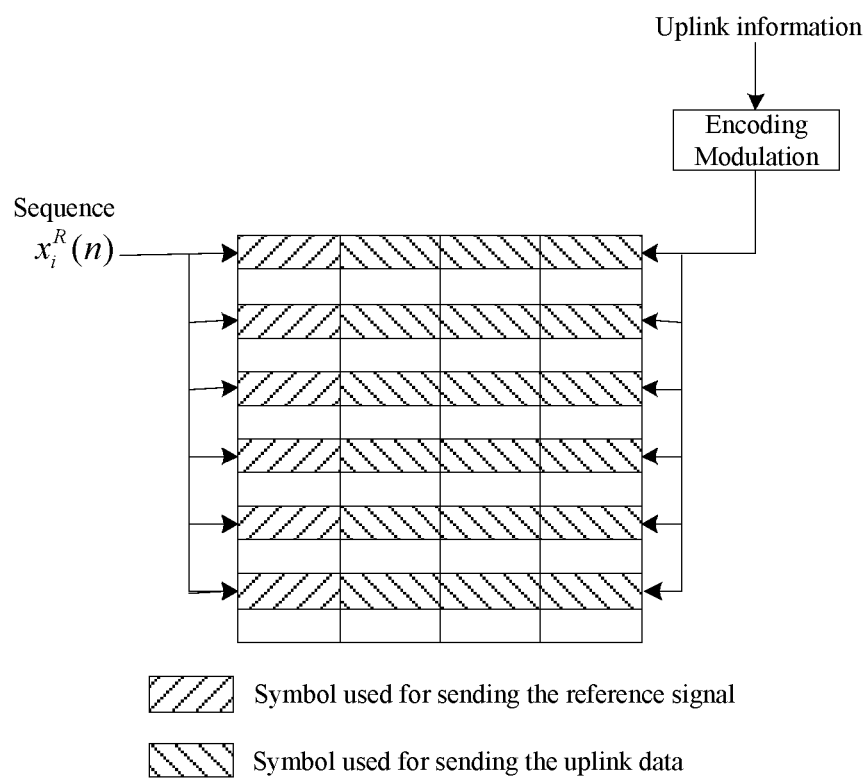
FIG. 7 is a schematic diagram illustrating information sending according to a specific embodiment 4 of the present disclosure.

FIG. 7 is a schematic diagram illustrating information sending according to a specific embodiment 4 of the present disclosure. As shown in FIG. 7, uplink information is sent on 4 symbols, that is, K=4. The first symbol is used for sending a reference signal and the last three symbols are used for sending uplink control information. The uplink information is transmitted in a comb mode; that is, the uplink information is merely carried on the corresponding odd or even subcarriers in the allocated frequency domain resources. Furthermore, the uplink information, after encoding, modulation, pre-coding and other operations, is mapped to a symbol used for sending the uplink information. The sequence $x_i^R(n)$ is directly mapped to a symbol used for sending the reference signal. Furthermore, the sequence $x_i^S(n)$ and the sequence $x_i^R(n)$ belong to the set of sequences $\{x_i(n)\}$. The sequence $x_i(n)$ satisfies:

$$x_i(n)=\exp(j\pi\varphi(n)/4),$$

where i denotes a sequence index, φ(n) is a predetermined parameter, values of i and φ(n) are shown in Tables 1/2/3/6/7/9, the value of φ(n) is determined by a sequence or a cyclic shift of the sequence in each row in Tables 1/2/3/6/7/9.

A terminal determines, according to frequency domain resources occupied by the uplink information to be sent, any one (corresponding to values of i in tables) of sequences in any of Tables 1/2/3/6/7/9, shown in examples given below:

when the terminal determines that 6 subcarriers in the frequency domain are occupied by the uplink information to be sent, any one (corresponding to values of i in tables) of sequences in any of Tables 1/2/3 is selected for the sending;

when the terminal determines that 12 subcarriers in the frequency domain are occupied by the uplink information to be sent, any one (corresponding to values of i in tables) of sequences in Table 6 is selected for the sending;

when the terminal determines that 18 subcarriers in the frequency domain are occupied by the uplink information to be sent, any one (corresponding to values of i in tables) of sequences in Table 7 is selected for the sending; and when the terminal determines that 24 subcarriers in the frequency domain are occupied by the uplink information to be sent, any one (corresponding to values of i in tables) of sequences in Table 9 is selected for the sending.

The sequence index i is determined according to a cell identifier, and the cyclic shift value α is determined according to an indication signaling of a base station; or the sequence index i and the cyclic shift value α are determined according to the indication signaling of the base station.

The cubic metric (CM) of the sequence is calculated using one of the following formulas:

$$CM = \frac{20\log_{10}\{\text{rms}|v_{norm}^3(t)|\} - 1.52}{1.56}\text{dB}$$

$$CM = \frac{20\log_{10}\{\text{rms}|v_{norm}^3(t)|\} - 1.524}{1.85}\text{dB}$$

$$CM = \left(\frac{20\log_{10}\{\text{rms}|v_{norm}^3(t)|\} - 1.52}{1.56} + 0.77\right)\text{dB}$$

where, $$\text{rms}(x) = \sqrt{\frac{(x'x)}{N}}, \text{ and } v_{norm}(t) = \frac{|v(t)|}{\text{rms}[v(t)]}.$$

The peak-to-average power ratio of the sequence is calculated using the following formula:

$$\text{PAPR}=10\log_{10}(|x(t)|^2/(\text{mean}(x(t)))),$$

where mean is to take the average value.

The cross-correlation of two sequences is calculated using one of the following formulas:

xcorr_coeffs=abs(NFFT*IFFT(seq1.*conj(seq2), NFFT)/length(seq1)); and     Formula 1 xcorr_coeffs =abs(sum((seq1.* conj(seq2)))/length (seq1),     Formula 2 where NFFT denotes the number of points of the (I)FFT operation, conj denotes conjugation, length denotes length, seq1 and seq2 are two sequences in the frequency domain, abs denotes absolute value, and sum denotes summation.

For formula 2, correlation values of the different cyclic shifts of any of the sequences in Tables 1/2/3/6/7/9 and of the different cyclic shifts of another one sequence in Tables 1/2/3/6/7/9 are required to calculate.

Table 1 (M=6) has properties shown in Table 11.

TABLE 11

|  | CM |  | PAPR |  | Cross-correlation |
|---|---|---|---|---|---|
| Max (Maximum Value) | 1.1653 | Max | 3.7544 | Max | 0.9310 |
| Mean (Mean Value) | 1.0245 | Mean | 3.1855 | Mean | 0.3628 |
| Min (Minimum Value) | 0.9303 | Min | 2.3861 | Min | 0 |

Table 2 (M=6) has properties shown in Table 12.

TABLE 12

|  | CM |  | PAPR |  | Cross-correlation |
|---|---|---|---|---|---|
| Max | 2.5264 | Max | 5.2288 | Max | 0.7454 |
| Mean | 1.9800 | Mean | 4.4883 | Mean | 0.3675 |
| Min | 1.1653 | Min | 3.5138 | Min | 0 |

Table 3 (M=6) has properties shown in Table 13.

TABLE 13

| CM | | PAPR | | Cross-correlation | | Cross-correlation with Table 4 | |
|---|---|---|---|---|---|---|---|
| Max | 2.5575 | Max | 4.9699 | Max | 0.7920 | Max | 0.9311 |
| Mean | 1.7709 | Mean | 4.4789 | Mean | 0.3679 | Mean | 0.3646 |
| Min | 1.0212 | Min | 3.7544 | Min | 0 | Min | 0 |

Table 6 (M=12) has properties shown in Table 14.

TABLE 14

| CM | | PAPR | | Cross-correlation | | Cross-correlation with Table 4 | |
|---|---|---|---|---|---|---|---|
| Max | 0.6759 | Max | 2.7956 | Max | 0.7384 | Max | 0.8232 |
| Mean | 0.5250 | Mean | 2.6594 | Mean | 0.2560 | Mean | 0.2558 |
| Min | 0.2307 | Min | 2.4060 | Min | 0 | Min | 0 |

Table 7 (M=18) has properties shown in Table 15.

TABLE 15

| CM | | PAPR | | Cross-correlation | | Cross-correlation with Table 8 | |
|---|---|---|---|---|---|---|---|
| Max | 0.5999 | Max | 2.8984 | Max | 0.5978 | Max | 0.6983 |
| Mean | 0.4862 | Mean | 2.7953 | Mean | 0.2098 | Mean | 0.2091 |
| Min | 0.2279 | Min | 2.5335 | Min | 0 | Min | 0 |

Table 9 (M=24) has properties shown in Table 16.

TABLE 16

| CM | | PAPR | | Cross-correlation | | Cross-correlation with Table 10 | |
|---|---|---|---|---|---|---|---|
| Max | 06399 | Max | 3.3967 | Max | 0.5487 | Max | 0.6128 |
| Mean | 0.5650 | Mean | 3.1721 | Mean | 0.1815 | Mean | 0.1808 |
| Min | 0.3961 | Min | 2.2799 | Min | 0 | Min | 0 |

CM is calculated by using the second CM calculation formula, cross-correlation is calculated by using the first cross-correlation formula, N_FFT=32M, and M is the length of the sequence. The sequences in the tables or subsets thereof are used as the reference signal or direct uplink information, which has advantages such as a small cubic metric and a high efficiency of the power amplifier. Especially, when the sequence index used by a neighboring cell is different, inter-cell interference is reduced and the overall performance of the system is improved.

Embodiment 4

A storage medium is further provided by an embodiment of the present disclosure. The storage medium includes a stored program which, when executed, executes any of above-mentioned methods.

In step S1, uplink information and/or a reference signal to be sent is determined.

In step S2, the uplink information and/or the reference signal is sent to a communication node via a first sequence.

Optionally, in this embodiment, the storage medium may include, but are not limited to, a U disk, a read-only memory (ROM), a random access memory (RAM), a mobile hard disk, a magnetic disk, an optical disk or another medium capable of storing program codes.

A processor is further provided by an embodiment of the present disclosure. The processor is used for executing a program, where, when executed, the program executes the above-mentioned method.

Optionally, in the present embodiment, the program described above is used for executing the steps described below.

In step S1, uplink information and/or a reference signal to be sent is determined.

In step S2, the uplink information and/or the reference signal is sent to a communication node via a first sequence.

Optionally, for specific examples in the present embodiment, reference may be made to the examples described in the above embodiments and optional implementation modes, and repetition will not be made in the present embodiment.

Apparently, each of the above-mentioned modules or steps of the present disclosure may be implemented by a general-purpose computing device, the modules or steps may be concentrated on a single computing device or distributed on a network formed by multiple computing devices, and alternatively, the modules or steps may be implemented by program codes executable by the computing devices, so that modules or steps may be stored in a storage device and executable by the computing devices. In some circumstances, the illustrated or described steps may be executed in sequences different from those described herein, or the illustrated or described steps may be made into various integrated circuit modules separately, or multiple modules or steps therein may be made into a single integrated circuit module for implementation. In this way, the present disclosure is not limited to any specific combination of hardware and software. In this way, the present disclosure is not limited to any specific combination of hardware and software.

What is claimed is:

1. A method for sending information, comprising:
   determining uplink information and/or a reference signal to be sent; and
   sending the uplink information and/or the reference signal to a communication node via a first sequence,
wherein the first sequence is one subset of a set of sequences having a length of M, wherein the set of sequences comprises a plurality of sequences and a cyclic shift of the sequences, and each sequence $x_i(n)$ of the set of sequences is represented by a formula:

$$x_i(n) = \exp(j\pi\varphi(n)/4),$$

wherein when M=6, $\varphi(n)$ comprises at least one of following sequences:
   Sequence 1: {1, 1, 1, −1, 3, −3},
   Sequence 2: {1, 1, 1, 3, −1, −3},
   Sequence 3: {1, 1, 1, −3, −1, 3},
   Sequence 4: {1, 1, 1, −3, 3, −1},
   Sequence 5: {1, 1, −1, −1, 3, −1},
   Sequence 6: {1, 1, −1, 3, −1, −1},
   Sequence 7: {1, 1, −1, 3, −3, −1},
   Sequence 8: {1, 1, 3, −1, 3, 3},
   Sequence 9: {1, 1, 3, −1, −3, 3},
   Sequence 10: {1, 1, 3, 3, −1, 3},
   Sequence 11: {1, 1, −3, 1, −1, −1},
   Sequence 12: {1, 1, −3, 1, 3, 3},
   Sequence 13: {1, 1, −3, 3, 1, 3}, and
   Sequence 14: {1, 1, −3, −3, 1 −3}.

2. An apparatus for sending information, comprising:
a processor; and
a memory for storing instructions executable by the processor,
wherein when executing the instructions, the processor is configured to implement the method of claim 1.

3. A storage medium, comprising a stored program, wherein the program, when executed, executes the method of claim 1.

4. A method for sending information, comprising:
determining uplink information and/or a reference signal to be sent; and
sending the uplink information and/or the reference signal to a communication node via a first sequence,
wherein the first sequence is one subset of a set of sequences having a length of M, wherein the set of sequences comprises a plurality of sequences and a cyclic shift of the sequences, and each sequence $x_i(n)$ of the set of sequences is represented by a formula:

$$x_i(n) = \exp(j\pi\varphi(n)/4),$$

wherein when M=18, $\varphi(n)$ comprises at least one of following sequences:
Sequence 1={−1, 3, −1, −3, 3, 1, −3, −1, 3, −3, −1, −1, 1, 1, 1, −1, −1, −1},
Sequence 2={3, −3, 3, −1, 1, 3, −3, −1, −3, −3, −1, −3, 3, 1, −1, 3, −3, 3},
Sequence 3={1, 1, −1, −1, −3, −1, 1, −3, −3, −3, 1, −3, −1, −1, 1, −1, 3, 1},
Sequence 4={3, −3, 1, 1, 3, −1, 1, −1, −1, −3, 1, 1, −1, 3, 3, −3, 3, −1},
Sequence 5={1, 1, −3, 3, 3, 1, 3, −3, 3, −1, 1, 1, −1, 1, −3, −3, −1, 3},
Sequence 6={3, −1, 3, 1, −3, −3, −1, 1, −3, −3, 3, 3, 3, 1, 3, −3, 3, −3},
Sequence 7={−3, −1, −3, −3, 1, 1, −1, −3, −1, −3, −1, −1, 3, 3, −1, 3, 1, 3},
Sequence 8={1, 1, −3, −3, −3, −3, 1, 3, −3, 3, 3, 1, −3, −1, 3, −1, −3, −1},
Sequence 9={3, 1, −3, 1, −3, 3, 3, −1, −3, −3, −1, −3, −3, 3, −3, −1, 1, 3},
Sequence 10={3, 3, 3, −3, −1, −3, −1, 3, −1, 1, −1, −3, 1, −3, −3, −1, 3, 3},
Sequence 11={−3, 1, 1, −3, 1, 1, 3, −3, −1, −3, −1, 3, −3, 3, −1, −1, −1, −3},
Sequence 12={1, −3, −1, −3, 3, 3, −1, −3, 1, −3, −3, −1, −3, −1, 1, 3, 3, 3},
Sequence 13={3, −1, −3, 1, −3, −3, −3, 3, 3, −1, 1, −3, −1, 3, 1, 1, 3, 3},
Sequence 14={3, −1, −1, 1, −3, −1, −3, −1, −3, −3, −1, −3, 1, 1, 1, −3, −3, 3}, and
Sequence 15={−1, −3, 1, −3, −3, −3, 1, 1, 3, 3, −3, 3, 3, −3, −1, 3, −3, 1}.

5. An apparatus for sending information, comprising:
a processor; and
a memory for storing instructions executable by the processor,
wherein when executing the instructions, the processor is configured to implement the method of claim 4.

6. A storage medium, comprising a stored program, wherein the program, when executed, executes the method of claim 4.

* * * * *